(12) United States Patent
Chen

(10) Patent No.: US 10,678,929 B2
(45) Date of Patent: Jun. 9, 2020

(54) SYSTEMS AND METHODS FOR EMBEDDING DATA IN REMOTE SESSION DISPLAYS

(71) Applicant: Citrix Systems, Inc., Fort Lauderdale, FL (US)

(72) Inventor: Hao Chen, Nanjing (CN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 207 days.

(21) Appl. No.: 15/917,276

(22) Filed: Mar. 9, 2018

(65) Prior Publication Data

US 2019/0278917 A1    Sep. 12, 2019

(51) Int. Cl.
| | | |
|---|---|---|
| G06F 21/60 | (2013.01) | |
| H04N 1/32 | (2006.01) | |
| G06F 21/16 | (2013.01) | |
| G06T 1/00 | (2006.01) | |

(52) U.S. Cl.
CPC ............ *G06F 21/602* (2013.01); *G06F 21/16* (2013.01); *H04N 1/3216* (2013.01); *H04N 1/32144* (2013.01); *H04N 1/32213* (2013.01); *G06T 1/0085* (2013.01); *G06T 2201/0051* (2013.01); *G06T 2201/0052* (2013.01)

(58) Field of Classification Search
CPC ........ G06F 21/602; G06F 21/16; G06F 21/10; H04N 1/32144; H04N 1/32213; H04N 1/3216; G06T 2201/0051; G06T 2201/0052; G06T 1/0085
See application file for complete search history.

(56) References Cited

U.S. PATENT DOCUMENTS 6,731,774 B1 *  5/2004  Hosaka .................. G06T 1/0071
                                               380/201
9,256,901 B2 *  2/2016  Vilke .................. G06Q 30/0641
(Continued)

FOREIGN PATENT DOCUMENTS

WO    2009025019 A1    2/2009
WO    2017137481 A1    8/2017

OTHER PUBLICATIONS

International Search Report and Written Opinion issued in international application No. PCT/US2019/017801 dated May 9, 2019.
(Continued)

*Primary Examiner* — J. Brant Murphy
(74) *Attorney, Agent, or Firm* — Fox Rothschild LLP; Robert J. Sacco; Carol E. Thorstad-Forsyth

(57) ABSTRACT

Systems and methods for embedding data in a dynamic image of a remote session display. The method includes, by a processor: receiving a display frame associated with the dynamic image, receiving data to be embedded in the display frame, identifying one or more stable regions in the display frame, upon identification of the one or more stable regions, updating a cache, identifying a largest stable region corresponding to the display frame in the cache, and embedding the data to be embedded in the largest stable region to create a region including embedded data. The cache includes a plurality of stable regions corresponding to one or more display frames associated with the dynamic image.

26 Claims, 9 Drawing Sheets

(56) References Cited

U.S. PATENT DOCUMENTS

| | | | | |
|---|---|---|---|---|
| 2003/0097568 A1* | 5/2003 | Choi | ............... | G06T 1/0042 |
| | | | | 713/176 |
| 2004/0151341 A1* | 8/2004 | Fujikawa | ............ | G06T 1/0028 |
| | | | | 382/100 |
| 2008/0089552 A1* | 4/2008 | Nakamura | ............ | G06T 1/0085 |
| | | | | 382/100 |
| 2012/0191575 A1* | 7/2012 | Vilke | ............ | G06Q 30/0641 |
| | | | | 705/27.1 |
| 2015/0067542 A1* | 3/2015 | Anderson | ............ | G06F 3/0481 |
| | | | | 715/756 |
| 2015/0324096 A1* | 11/2015 | Leblanc | ............ | G11B 27/034 |
| | | | | 715/720 |
| 2016/0147940 A1* | 5/2016 | Flint | ............ | H04L 63/10 |
| | | | | 705/3 |
| 2016/0241895 A1* | 8/2016 | Mohacs | ............ | G06F 21/105 |
| 2016/0284105 A1* | 9/2016 | Dawood | ............ | G06T 9/00 |
| 2017/0357875 A1* | 12/2017 | Hardee | ............ | G06K 9/6201 |

OTHER PUBLICATIONS

Honggang Wang et al., "Energy-Aware Adaptive Watermarking for Real-Time Imagie Delivery in Wireles Sensor Networks," IEEE International Conference on Communications, ICC '08, May 19, 2008 XP031265607 ISBN: 978-1-4244-2075-9.

\* cited by examiner

SYSTEMS AND METHODS FOR EMBEDDING DATA IN REMOTE SESSION DISPLAYS

BACKGROUND

Statement of the Technical Field

The present application generally relates to embedding data in remote session displays. In particular, the present application relates to systems and methods for embedding invisible data in stable regions of a dynamic image associated with a remote session display to prevent unauthorized acquisition of information from the dynamic image.

Description of the Related Art

More and more people are using mobile devices in personal and business settings for a variety of purposes. These devices are often used by individuals to send and receive emails, manage appointments, share media files, consume media content, and perform a plethora of other activities, sometimes from remote or unusual locations. As these devices continue to grow in popularity and provide an increasing number of business applications, enterprise mobile applications are providing employees with means to access networked enterprise applications from their mobile device. Users are able to access their emails, documents, and other mobile applications across multiple different devices with the advent of cloud-based applications and devices.

As mobile users spend time in public places, they access sensitive content by frequently checking email, notes, and opening sensitive documents on their mobile devices. Mobile users who create and read documents in public places access various confidential and secure content on their mobile devices. Further, virtualization technologies can provide remote access to computer resources and/or enterprise applications across public or private networks. Users can use a variety of clients to access a virtual desktop or applications running on a host computer in the virtualized environment. Currently, such consumers of secure content on mobile devices and/or a remote device in a virtualized environment risk exposing the secure content to the public if they access such content in public because the secure content may be displayed in plain view and/or may be played back on the users' mobile devices. When users access such secure content in a public setting, any bystander may be able to view and/or listen to the secure content. Such confidential content may even be stolen without knowledge of the mobile user when someone close to the mobile device takes a photograph, video, and/or audio recording of the confidential content accessed on the user's mobile device or remote device in public.

Similar security and privacy issues can arise in other environments. For example, Automatic Teller Machines (ATMs) are readily available, but typically ATMs are placed in conspicuous locations for ease of use. The conspicuous nature of the chosen public location can contribute to the ease of observation, which can permit an unauthorized viewer to obtain an ATM user's confidential information as the user inserts their ATM card into the ATM and subsequently keys in a Personal Identification Number (PIN).

Embedding identifiable data (e.g., digital watermarks) in an image displayed on a user interface may help mitigate above problems. The image may be modified such that the embedded data is imperceptible or nearly imperceptible to the user, yet may be detected through an automated detection process. Arrangements can then be made so that any unauthorized access or copying of the original image or data file runs the risk of the extracted data exposing the lack of legal ownership of the file.

Data may be embedded in an image by various methods. One such method include embedding or hiding data into the least significant bit of bit information indicating each pixel value of an image, i.e., hiding data in the lowest order bit of a data sample (e.g., for an 8 bit per pixel image, region I comprises the 7 most significant bits and region II comprises the least significant bit). While such a process is simple and fast, it is vulnerable to simple modifications performed on the graphical image such as resizing, color scheme adjustment, image compression, etc. Another approach is to embed or hide data in a frequency domain representation of an image, where the frequency domain representation may be obtained by performing mathematical transformations (e.g., 2D fast fourier transform "FFT") on the space domain representation of the image. However, this approach is computationally expensive and is typically used for embedding data in static images only. Using this approach to embed data over each screen frame of a dynamic image in real time (particularly when transmitting image data to a remote device in a virtualization environment) is impractical because of the resultant loss of performance.

SUMMARY

Implementing systems and methods for embedding data in a dynamic image of a remote session display. The method may include, by a processor: receiving a display frame associated with the dynamic image, receiving data to be embedded in the display frame, identifying one or more stable regions in the display frame, upon identification of the one or more stable regions, updating a cache, identifying a largest stable region corresponding to the display frame in the cache, and embedding the data to be embedded in the largest stable region to create a region including embedded data. The cache includes a plurality of stable regions corresponding to one or more display frames associated with the dynamic image.

In some scenarios, the method may also include composing a composite frame by replacing an area corresponding to the largest stable region in the display frame with the region including embedded data. In some scenarios, the method may further include encrypting the data to be embedded before performing the embedding.

In certain scenarios, the method may also include, before embedding the data to be embedded in the largest stable region determining whether the largest stable region already includes the data to be embedded, and performing the embedding only if the largest stable region does not include the data to be embedded.

In one or more scenarios, the method may include, before embedding the data to be embedding in the largest stable region, determining whether a size of the largest stable region is less than a threshold size, and performing the embedding in the largest stable region only if the size of the largest stable region is not less than threshold size. The threshold size may be equal to at four times a length of the data to be embedded. In some scenarios, in response to determining that the size of the largest stable region is less than the threshold size, the method may include embedding the data to be embedded in the display frame using a least significant bit algorithm. Optionally, performing the embedding in the largest stable region may include performing a transform function on the largest stable region to create a frequency domain representation of the largest stable region, creating an empty bitmap, embedding the data to be embedded in the empty bitmap to create a bitmap including embedded data, substituting a section of the frequency domain representation of the largest stable region with the bitmap including embedded data to create a modified frequency domain representation, and performing a reverse transform function on the modified frequency domain representation. The transform function may be a fast fourier transform (FFT) and the reverse transform function is a reverse FFT. In certain scenarios, substituting the section of the frequency domain representation of the largest stable region with the bitmap including embedded data may include substituting a bottom right corner section of the frequency domain representation of the largest stable region. Creating the empty bitmap may include creating the empty bitmap that has a pixel height that is half of a pixel height of the largest stable area and a pixel length that is half of a pixel length of the largest stable area.

In one or more scenarios, the method may include including an identifier in the region including embedded data, and replacing the largest stable region with the region including embedded data in the cache.

In some scenarios, identifying the one or more stable regions in the display frame may include comparing the display frame with at least one previous display frame associated with the dynamic image.

BRIEF DESCRIPTION OF THE DRAWINGS

Embodiments will be described with reference to the following drawing figures, in which like numerals represent like items throughout the figures.

DETAILED DESCRIPTION

Figure 1:
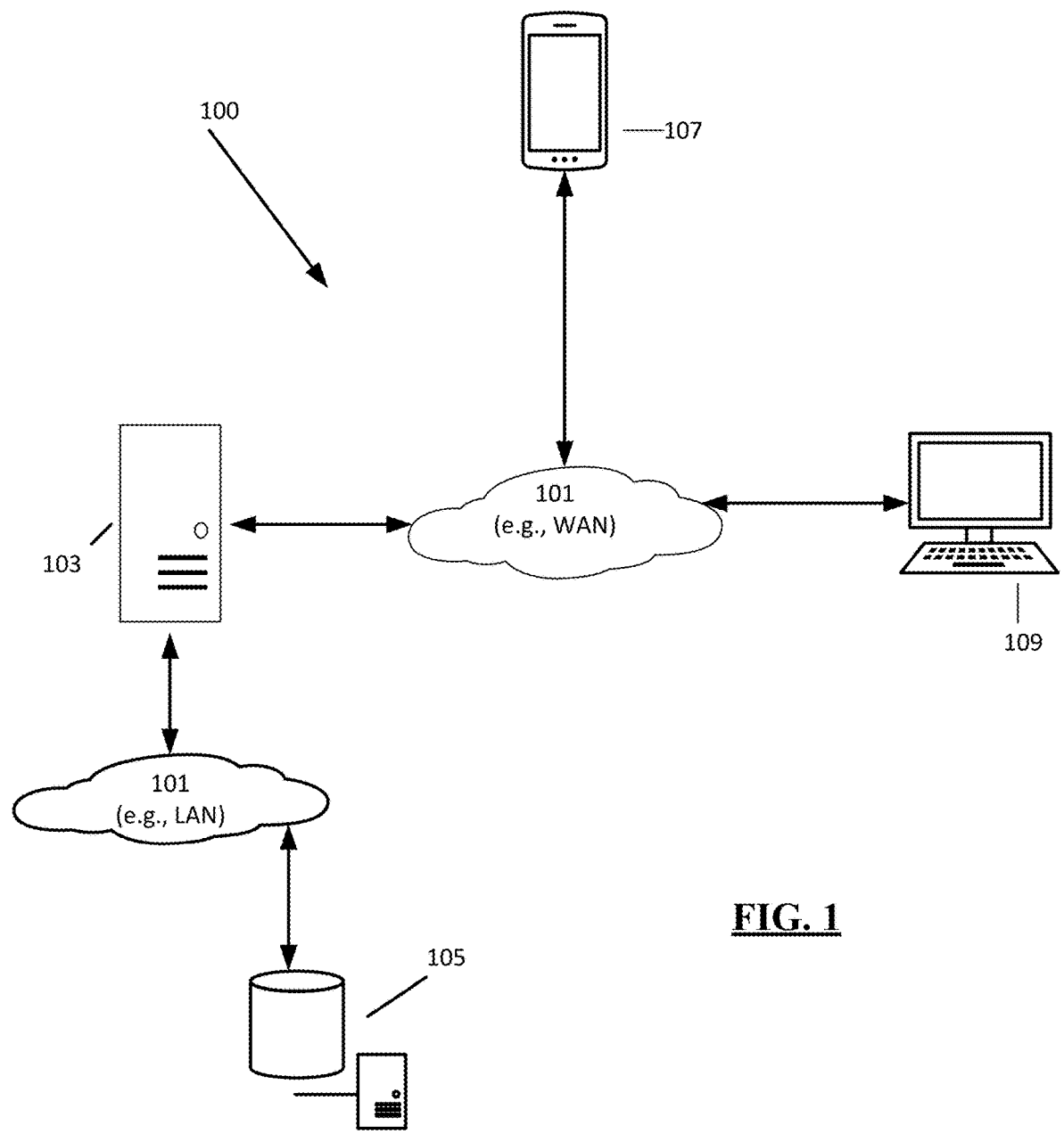
FIG. 1 illustrates an exemplary computer system architecture that may be used in accordance with one or more illustrative aspects described herein.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

As used herein, a "dynamic image" refers to an image displayed on a graphical environment or space (e.g., a display associated with a user interface) that changes over time depending upon parameters, such as, without limitation, user interaction, application execution, or the like. A dynamic image may be generated using a series of "display frames" (or "frames") where each subsequent display frame ($A_N$) may include certain regions ("transient regions") that are different from those of the display frame crated before it ($A_{N-1}$), and certain regions ("stable regions") that are the same as those of the display frame $A_{N-1}$.

Referring now to FIG. 1, a schematic block diagram illustrating an example system architecture in which the embodiments described herein may be implemented in a standalone and/or networked environment is shown. Computer software, hardware, and networks may be utilized in a variety of different system environments, including stand-alone, networked, remote-access (aka, remote desktop), virtualized, and/or cloud-based environments, among others.

As shown in FIG. 1, various network nodes (or devices) 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server(s) 103, web server(s) 105, and client computers 107, 109. Data server 103 provides overall access, control and administration of databases and control software for performing one or more illustrative aspects describe herein. Data server 103 may be connected to web server 105 through which users interact with and obtain data as requested. Data server 103 may be a mobile device connected to web server 105 and client computers 107 and 109 through network 101. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device, discussed below in detail with respect to FIG. 3.

Figure 2:
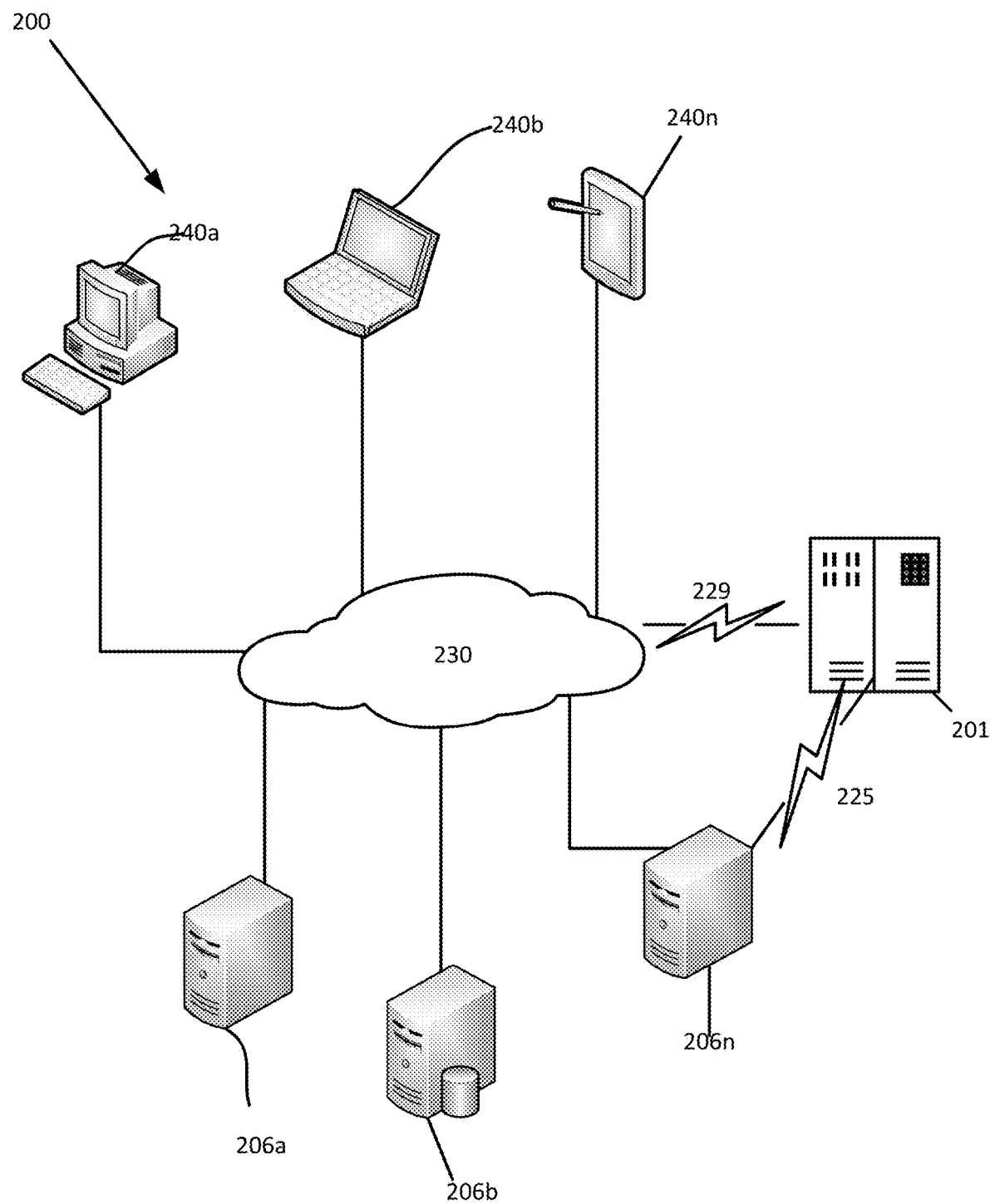
FIG. 2 illustrates an exemplary remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device (e.g., a mobile computing device) 201 configured to provide remote access to managed applications to its users in a secure environment. Computing device 201 may operate in a networked environment supporting connections to one or more remote computers, such as terminals 240a, 240b, and 240n (also referred to as client devices or clients or client machines). The terminals 240a, 240b, and 240n may be personal computers, mobile devices, laptop computers, tablets, or servers that include many or all of the elements described below in FIG. 3. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter. When used in a WAN networking environment, computing device 201 may include a modem or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240a, 240b, and 240n may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240a, 240b, and 240n may be in communication with one or more servers 206a-N. In one embodiment, the computing environment 200 may include a network appliance (not shown here) installed between the server(s) 206a-N and client device(s) 240a, 240b, and 240n. The network appliance may manage client/server connections, and in some cases can load balance client connections amongst a plurality of backend servers 206a-N. In some embodiments, computing device 201 may be a mobile client device in communication with other client device(s) 240a, 240b, and 240n.

The client device(s) 240a, 240b, and 240n may in some embodiments be referred to as a single client machine or a single group of client machines, while server(s) 206a-N may be referred to as a single server or a single group of servers. In one embodiment a single client machine communicates with more than one server, while in another embodiment a single server communicates with more than one client machine. In yet another embodiment, a single client machine communicates with a single server.

A client machine can, in some embodiments, be referenced by any one of the following non-exhaustive terms: client machine(s); client(s); client computer(s); client device (s); client computing device(s); local machine; remote machine; client node(s); endpoint(s); or endpoint node(s). The server, in some embodiments, may be referenced by any one of the following non-exhaustive terms: server(s), local machine; remote machine; server farm(s), or host computing device(s).

In one embodiment, the client machine may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server or a hypervisor executing on a client.

Some embodiments include a client device that displays application output generated by an application remotely executing on a server or other remotely located machine. In these embodiments, the client device may execute a virtual machine receiver program or application to display the output in an application window, a browser, or other output window. In one example, the application is a desktop, while in other examples the application is an application that generates or presents a desktop. As used herein, a desktop refers to a graphical environment or space in which one or more applications may be hosted and/or executed. A desktop may include a graphical shell providing a user interface in the form of a dynamic image for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

The server, in some embodiments, uses a remote presentation protocol or other program to send data to a thin-client or remote-display application executing on the client to present display output generated by an application executing on the server. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server such that the servers are logically grouped together into a server farm, for example, in a cloud computing environment. The server farm may include servers that are geographically dispersed while and logically grouped together, or servers that are located proximate to each other while logically grouped together. Geographically dispersed servers within a server farm can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments, the server farm may be administered as a single entity, while in other embodiments the server farm can include multiple server farms.

In some embodiments, a server farm may include servers that execute a substantially similar type of operating system platform (e.g., WINDOWS, UNIX, LINUX, iOS, ANDROID, SYMBIAN, etc.) In other embodiments, server farm may include a first group of one or more servers that execute a first type of operating system platform, and a second group of one or more servers that execute a second type of operating system platform.

Server(s) may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server that receives requests from a client machine, forwards the request to a second server, and responds to the request generated by the client machine with a response from the second server. First server may acquire an enumeration of applications available to the client machine as well as address information associated with an application server hosting an application identified within the enumeration of applications. First server can then present a response to the client's request using a web interface, and communicate directly with the client to provide the client with access to an identified application. One or more clients and/or one or more servers may transmit data over network 230, e.g., network 101.

The architecture of the desktop virtualization system illustrated in FIG. 2 may be single-server or multi-server system, or cloud system, including at least one virtualization server configured to provide virtual desktops and/or virtual applications to one or more client access devices.

Figure 3:
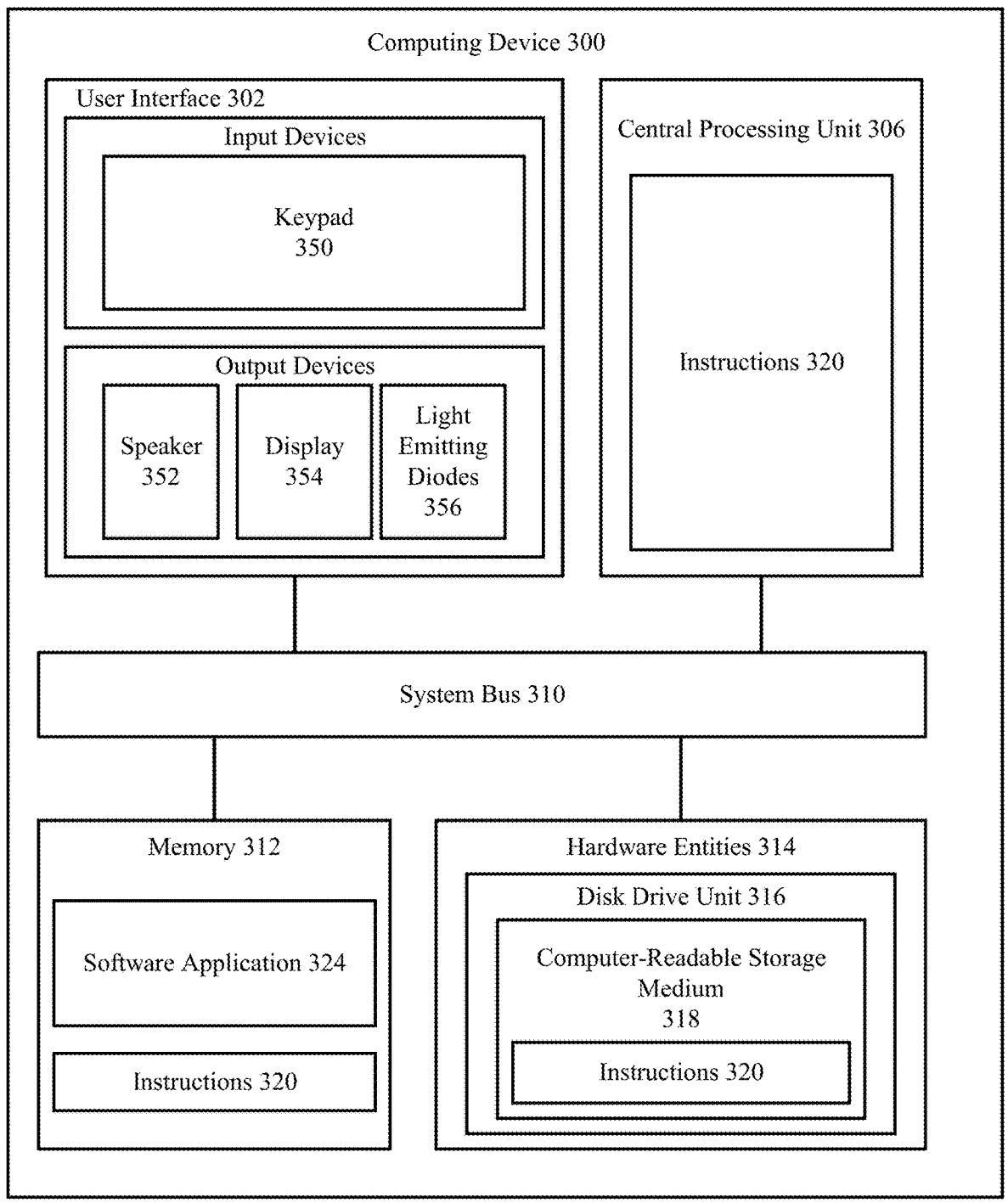
FIG. 3 illustrates block diagram of an exemplary architecture for a computing device in accordance with one or more illustrative aspects described herein.

Referring now to FIG. 3, there is provided a detailed block diagram of an exemplary architecture for a computing device 300, in which the present invention may be implemented, deployed as and/or executed on any embodiment of the computing device 300. As such, the following discussion of computing device 300 is sufficient for understanding for the implementation of the architecture 100 of FIG. 1 and 200 of FIG. 2. The computing device 300 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, virtual machines, distributed computing environments that include any of the above systems or devices, and the like.

Computing device 300 may include more or less components than those shown in FIG. 3. However, the components shown are sufficient to disclose an illustrative embodiment implementing the present solution. The hardware architecture of FIG. 3 represents one embodiment of a representative computing device configured to facilitate testing, support, and remote execution of software applications. As such, the computing device 300 of FIG. 3 implements at least a portion of a method for embedding secret data in a dynamic remote session display, as discussed below.

Some or all the components of the computing device 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the computing device 300 comprises a user interface 302, a Central Processing Unit ("CPU") 306, a system bus 310, a memory 312 connected to and accessible by other portions of computing device 300 through system bus 310, and hardware entities 314 connected to system bus 310. The user interface can include input devices (e.g., a keypad 350) and output devices (e.g., speaker 352, a display 354, and/or light emitting diodes 356), which facilitate user-software interactions for controlling operations of the computing device 300.

At least some of the hardware entities 314 perform actions involving access to and use of memory 312, which can be a RAM, a disk driver and/or a Compact Disc Read Only Memory ("CD-ROM"). Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the computing device 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions for execution by the computing device 300 and that cause the computing device 300 to perform any one or more of the methodologies, as described herein.

In some scenarios, the hardware entities 314 include an electronic circuit (e.g., a processor) programmed for facilitating method for embedding secret data in a dynamic remote session display, as discussed below. In this regard, it should be understood that the electronic circuit can access and run a software application 324 installed on the computing device 300. The functions of the software application 324 will become apparent as the discussion progresses.

In one embodiment, a computing device 300 can be a virtual machine. The virtual machine can be any virtual machine, while in some embodiments the virtual machine can be any virtual machine managed by a hypervisor developed by Citrix Systems, IBM, VMware, or any other hypervisor. In other embodiments, the virtual machine can be managed by any hypervisor, while in still other embodiments, the virtual machine can be managed by a hypervisor executing on a server or a hypervisor executing on a client machine.

Figure 4:
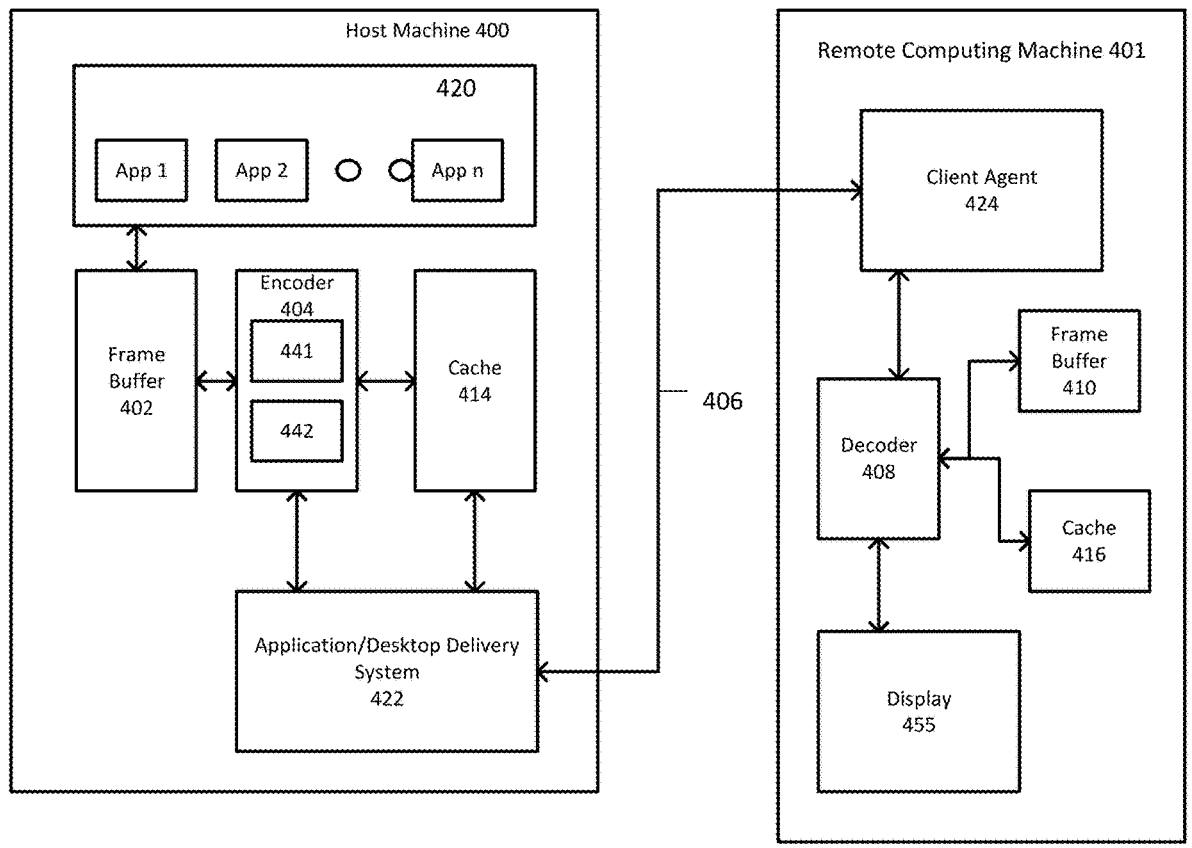
FIG. 4 illustrates an exemplary system for embedding data in a remote session display in accordance with one or more illustrative aspects described herein.

Illustrated in FIG. 4 is one embodiment of a system for embedding data in a remote session display. FIG. 4 is a diagram that illustrates an encoder 404 including a stable region detector 441 and a data embedding module 442 associated with a host machine 400 and a remote computing machine 401. The remote computing machine 401, in this embodiment, is configured to operate as a client (e.g., a thin client) of the host machine 400 via, for example, a remote desktop session. The remote computing machine 401 can be used to interact with an application operating at the host machine 400 via a communication link. The host machine 400 can be configured to send, to the remote computing machine 401, a stream of display frames that create a dynamic image on a user interface (e.g., display 455) representing responses to user interactions with the application during a remote desktop session.

This system can include a host machine 400 executing one or more applications 420, where each application can generate display output (i.e., a display frame) that can be passed to a frame buffer 402 also executing on the host machine 400. The frame buffer 402 can pass the received display frame to an encoder 404 executing on the host machine 400, where the encoder 404 can further communicate with a cache 414 for additional information, and where both the encoder 404 and the cache 414 can communicate with an application/desktop delivery system 422. In an embodiment, the encoder 404 also includes an embedding module 442. The application/desktop delivery system 422 communicates with a remote computing machine 401, and in particular a client agent 424 executing on the remote computing machine 401, over a virtual channel 406 and via a presentation level protocol. The client agent 424 can transmit display frame content to a decoder 408 executing on the remote computing machine 401. The decoder 408 can communicate with a frame buffer 410 and with cache 416 on the remote computing machine 401, and may provide the display frame for output on the display 455.

Referring to FIG. 4, and in greater detail, in one embodiment the host machine 400 and the remote computing machine 401 can be any of the computing machines described herein. In another embodiment, the host machine 400 can be a server or a server farm and the remote computing machine 401 can be a client; while in other embodiments the host machine 400 can be a client and the remote computing machine 401 can be a server, a server in a server farm, or a server farm. In still other embodiments, the host machine 400 can be a first computing machine and the remote computing machine 401 can be a second computing machine; and in other embodiments, the host machine 400 can be a second computing machine and the remote computing machine 401 can be a first computing machine. Still further, the host machine 400 and remote computing machines 401 can communicate over a virtual channel 406 via a presentation level protocol such as any presentation level protocol described herein. Communication between the host, machine 400 and the remote computing machine 401 can take place over a network such as any of those networks described herein.

In one embodiment, the host machine 400 can execute any number of applications 420. A first application, a second application, a third application, and any 'n' number of applications can execute on the host machine 400, where 'n' is a whole number between 1 and any maximum number of applications that a particular computing machine can execute. Collectively, the applications can be referred to as applications 420.

Executing on the host machine 400 is a frame buffer 402 communicating with an encoder 404, and which stores the contents (e.g., display frames) from a source (e.g., application) in the form of pixels. In some embodiments, the frame buffer 402 can be any buffer able to contain graphics, graphics commands, images or any other graphical or media content. The frame buffer 402 can in some embodiments store the pixel color data for each pixel in a particular image or image portion. This pixel color data can be obtained from an image rendererable to input graphical drawing commands and output an image such as a PEG a bitmap, a TIF, a GIF, a PNG, or any other type of media content. While the frame buffer 402 is depicted as communicating only with the applications 420 and the encoder 404, in other embodiments the frame buffer 402 can communicate with any number of system components within the host machine 402 such as the cache 414 and the application/desktop delivery system 422.

In some embodiments, the frame buffer 402 receives image/frame data or display graphics from at least one application 420 and stores the received data or graphics before passing it along to the encoder 404. In an embodiment, the contents of the frame buffer 402 are fed to an encoder 404, for example, periodically or upon a change being detected or some other triggering event. In other embodiments, the frame buffer 402 stores the image/frame data or display graphics in a storage repository such as cache before passing the image data or display graphics to the encoder 404.

The encoder 404 in many embodiments, inputs image/frame data or display graphics and encodes or compresses the data or graphics according to an encoding or compression algorithm, in one embodiment, the encoder 404 encodes the inputted data or graphics according to the encoding methods and processes described herein. In other embodiments, the encoder 404 can both encode the data and compress the data according to any of the following types of compression: lossless, lossy, Lempel-Ziv, Huffman, Adaptive Huffman, Golomb, or any other type of compression consistent and operative with the encoding methods described herein. In some embodiments, the encoder 404 transmits an encoded and/or compressed display frame to an application/desktop delivery system 422 for transmission to a remote computing machine 401; however in other embodiments, the encoder 404 transmits an encoded and/or compressed display frame to a remote computing machine 401 rather than sending the encoded/compressed data to a delivery system 422 for transmission. While FIG. 4 depicts the encoder 404 as communicating with the frame buffer 402, cache 414, embedding module 450, and the application/desktop delivery system 422; the encoder 404 can communicate with any number of components on the host machine 400 including the applications 420. In some embodiments, the encoder 404 can be included within the frame buffer 402.

Encoder 404 is one or more modules, which can be packaged functional hardware units designed for use with other components or a part of a program that performs a particular function, corresponding to the particular step, of related functions. The one or more modules of encoder 404 can include a stable region detector 441 and an embedding module 442. In some embodiments, these components are separate modules communicatively coupled to encoder 404 instead of contained within encoder 404. Stable region detector 441 can be one or more modules for comparing display frames with previous display frames and data stored in memory (e.g., system memory, cache 414, or CPU registers) to determine regions of the dynamic image that are stable. Various characteristics can indicate a region is stable (discussed below). In an embodiment, the pixels of a previous display frame are stored cache 414 and stable region detector 441 determines whether a current frame includes one or more stable regions. Stable region detection is discussed in more detail below in reference to FIG. 5 and FIG. 6. In some embodiments, stable region detector 441 detects when a previously identified stable region is no longer stable and notifies the embedding module of the same. After stable region detector 441 identifies stable regions of the image, the stable region detector can provide those regions to an embedding module 442. Embedding module 442 can embed data in the stable regions as discussed below.

Embedding module 442 can be one or more modules for embedding data in one or more stable regions of an image. The data may include information that can be used to identify origin and/or ownership of the underlying content of an image displayed on a desktop, such as, without limitation, a source of the image, an author of the image, a display screen displaying the image, or the like. Examples of such information may include, without limitation, user identification information, enterprise information, image source information, client device information, or the like. The data may also include any suitable information that allows (or denies) end users and/or end user devices to access and/or control associated images, such as digital rights management (DRM) information and/or conditional access (CA) information (CAI). In some embodiments, embedding module 442 may include an encryption module for encrypting information to be embedded in the stable regions of an image. Encryption may refer to any means for transforming data from an interpreted form and securing it by a process that renders the data uninterpretable to anyone but those with the means to decrypt the encrypted data. Encryption may refer to a wide variety of encryption standards and techniques, including private key and public key encryption. Encryption and decryption may be accomplished via a system implementing passwords, keys, or a combination of both, Encryption schemes may include symmetric-key encryption schemes where secret keys are exchanged between the party seeking to encrypt data and the party seeking to decrypt data. Such schemes may also be referred to as "shared secret" or "pre-shared" encryption schemes. Examples of such encryption schemes may include the Advanced Encryption Standard, Blowfish, Twofish, Serpent, CAST5 (also known as CAST-128) or other CAST variant (e.g., CAST 256), Rivest Cipher 4 (RC4) or other RC variant (e.g., ARC4), Triple Data Encryption Standard (Triple DES or 3DES), and International Data Encryption Algorithm (IDEA). Examples of symmetric algorithm may include AES-128, AES-192, and AES-256. It is understood that throughout this disclosure, where symmetric key encryption is used or disclosed, one could also alternatively use any other form of encryption to successfully implement the systems and methods disclosed herein, including asymmetric encryption or any other form of encryption.

After data has been embedded in one or more regions of a display frame, encoder 404 can encode the display frame and forward the frame to a remote device and/or provide the encoded frame to another component of computing system 400.

It is appreciated that other systems and components within the computing environment can implement embodiments consistent with the present disclosure. Accordingly, the present disclosure of a dedicated encoder component is exemplary. Subsequent figures, diagrams, and descriptions will reference encoder 404 and its components as exemplary for implementing embodiments consistent with the present disclosure but is not intended to limit the disclosure to the structure of encoder 404.

Cache(s) 414, 416 can comprise any of the storage repository or memory types described herein. In an embodiment, cache(s) 414, 416 may store display frames. In one embodiment, a set of pre-defined images are stored in cache(s) 414, 416. These pre-defined or pre-stored images can comprise image sections of larger images and in some embodiments can contain an index. The index can be created by calculating a CRC for the stored images or computing a hash or a checksum. In other embodiments, the index can be any identifying element able to distinguish the pixel data within a particular stored image from the pixel data within another stored image.

The application/desktop delivery system 422 can be any application/desktop delivery system 422 described herein and in some embodiments can be CITRIX XenAPP or Xen DESKTOP. The application/desktop delivery system 422 can transmit information over a communication channel 406 to a client agent 424 executing on the remote computing machine 401 via a presentation level protocol such as any of those presentation level protocols described herein. In some embodiments, the presentation level protocol can be: the ICA protocol developed by CITRIX SYSTEMS; the RDP protocol developed by MICROSOFT; or any other presentation level protocol operative with the methods and systems described herein. The application/desktop delivery system 422 can receive data, i.e. frame, image or graphical data, and transmit the data over the communication channel 406 to the client agent 424 on the remote computing machine 401. The client agent 424 can then process the data and transmit it to any number of components within the remote computing machine 401.

In one embodiment, the client agent 424 transmits the received data to a decoder 408 executing on the remote computing machine 401. The decoder 408 can decode and/or decompress data that was previously encoded and/or compressed by the encoder 404. FIG. 4 depicts the decoder 408 as communicating with the client agent 424, cache 416 and the frame buffer 410, however in some embodiments the decoder 408 can communicate with any components of the remote computing machine 401.

Figure 5:
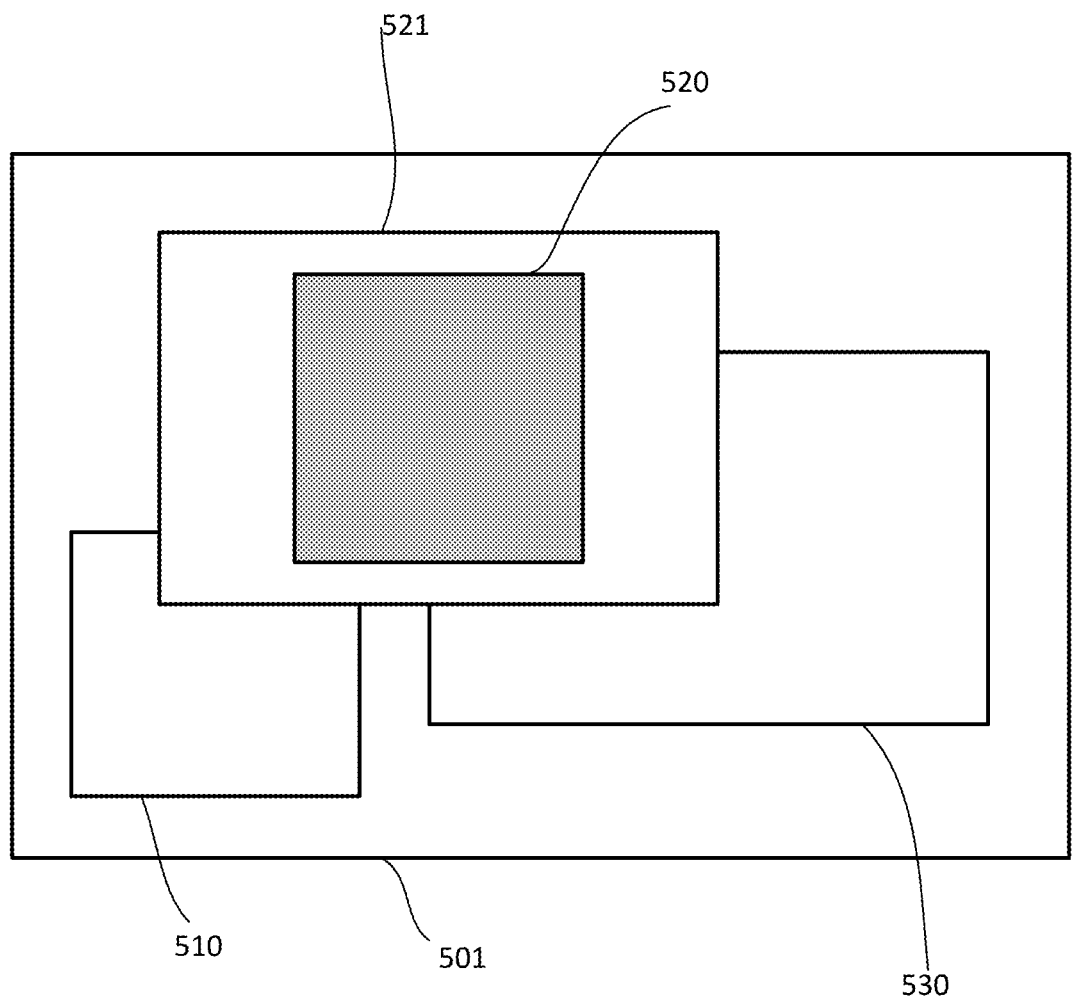
FIG. 5 illustrates an exemplary dynamic image in accordance with one or more illustrative aspects described herein.

FIG. 5 illustrates an exemplary dynamic image 501 on a user interface (e.g., a desktop), consistent with embodiments of the present disclosure. Dynamic image 501 can provide a visual representation of the state of applications running on the computing system. Dynamic image 501 can be presented on a display device (e.g., display device 455 attached to remote client device 402). The user can then interact with the system through input devices and the results of that interaction via dynamic image 501 are presented to the user through the display device.

Dynamic image 501 can contain application windows (e.g., windows 510, 520 and 530) corresponding to applications or processes running on the computing system. These application windows can provide the user with a visual representation of the application in the form of a dynamic session display that includes a stream of images having one or more stable regions and one or more transient regions. Application windows 510, 520, and 530 can represent a variety of applications. For example, an application can be a web browser, a word processor, a spreadsheet application, an image editor, an instant messaging client, a video player, a music player, or grouping of instructions executing on the computing system. In some embodiments, an application provides multiple application windows.

As a user interacts with dynamic image 501, the system updates the dynamic image 501. When an application window (e.g., application window 510, 520, or 530) in dynamic image 501 changes, the application corresponding to the application window instructs the operating system to update the display of the application window. The operating system can combine updates from all of the application windows compositing them into one unified image. In some embodiments, the system may use a graphics processing unit for compositing and other graphic operations necessary to create a final display frame representing all updates to dynamic image 501. After it is composited, the final frame or image can be stored in a frame buffer (e.g., frame buffer 402) until output on the display device (e.g., display device 455) or forwarded to a remote client (e.g., remote client device 402) for display. In an embodiment, the frame or image can be stored as a bitmap image ready for display. Other file formats, such as vector images, are within the scope of this disclosure. These types of display mechanisms can be referred to as compositing window managers. Examples of compositing window managers include Quartz Compositor in Mac OS X, Desktop Window Manager in Microsoft Windows 7 and later versions, KWin, Compiz, and 5Dwm among others. By compositing the image within a compositing window manager instead of allowing applications to update a frame buffer directly, the operating system can exert more control over how application updates are represented in the final composited image. It is appreciated that embodiments consistent with the present disclosure are compatible with any display system where the output includes an image and are not limited to display systems classified as compositing window managers.

In a remote computing environment, including a virtualized computing environment for remote clients, the contents of a frame buffer can be forwarded to the remote client and the remote client can present the display frame to the user.

Figure 6:
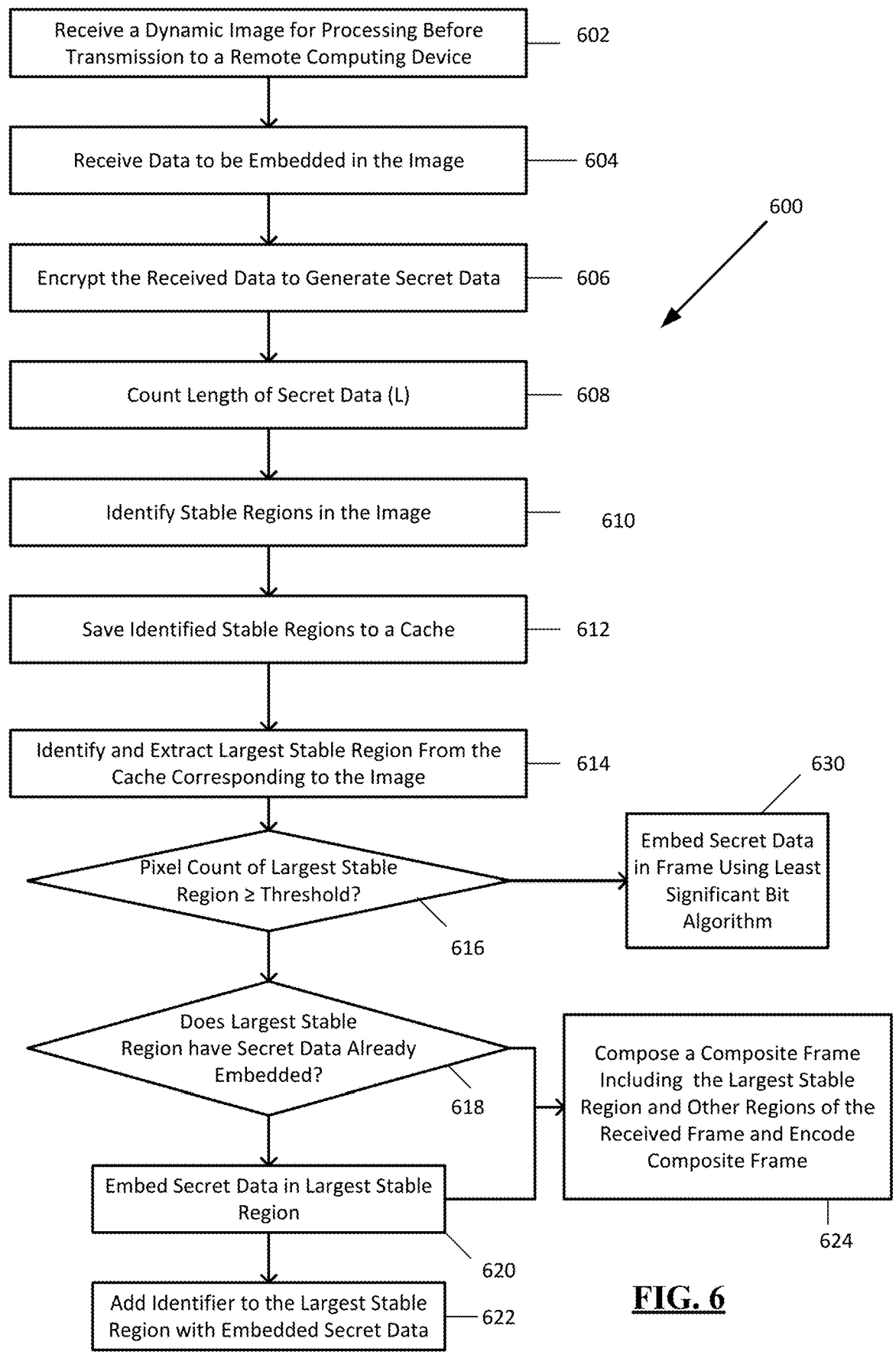
FIG. 6 is a flowchart illustrating an example method for embedding data in a remote session display in accordance with one or more illustrative aspects described herein.

Referring now to FIG. 6, an example method 600 for embedding data in a dynamic image of a remote session display, in a computing environment is illustrated. An example computing environment 400 is illustrated in FIG. 4. In one or more embodiments, the process 600 illustrated in FIG. 6 and/or one or more steps thereof may be performed by a computing device (e.g., any device of FIGS. 1-3). In other embodiments, the process illustrated in FIG. 6 and/or one or more steps thereof may be embodied in computer-executable instructions that are stored in a computer-readable medium, such as a non-transitory computer-readable memory. While the method 600 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 6, but the process may be integrated and/or one or more steps may be performed together, or the steps may be performed in the order disclosed or in an alternate order.

The method 600 may begin at 602, when the encoder receives a display frame associated with a dynamic image representing a portion of a desktop and corresponding to a dynamic session display (e.g., from an application or a frame buffer) for processing before being transmission to a remote computing device. In an embodiment, the display frame may be a bitmap image and/or in any other format. As discussed above, one or more regions of the dynamic image may be continuously updated by generating new display frames for the dynamic image. As such, the dynamic image may be associated with a series of display frames over a period of time, where one or more regions of each display frame may be different from the corresponding region of the previous display frame. In an embodiment, the encoder may receive a new display frame corresponding to the dynamic image periodically or upon a change being detected or some other triggering event.

The encoder may also receive 604 data to be embedded in the display frame before being displayed, where the data is indicative of origin and/or ownership of the underlying content of the dynamic image.

At 606, the embedding module may encrypt the received data using, for example, a symmetric key encryption algorithm to generate secret data. The embedding module may save the key used for encrypting the data for later use. For example, the saved key may be used to recover the embedded data from an image and/or a copy of the image. The embedding module may also determine length (L) (e.g., as number of bits) of the secret data at 608. It will be understood to those skilled in the art that data may be embedded in the display frame without performing the encryption.

At 610, the stable region detector of the encoder may identify stable regions in the display frame by comparing various regions within the display frames associated with the dynamic image over a period of time. Stable regions can be defined by many different characteristics. In some embodiments, a determination that a region is stable involves, without limitation, considering the size of the region, the stability of the region, regions that have not changed in a threshold number of previous display frames, regions that have not changed in a threshold period of time, whether the region contains regions that have previously been cached, etc. For example, in some embodiments, only regions over a threshold size related to the length L of secret data can be considered stable. In other embodiment, only regions over threshold number of pixels can be considered stable. In some embodiments, only regions that are stable in size and/or location can be considered stable. In some embodiments, minor changes in the size and/or location of the region can be ignored. The amount of tolerance for changes in these embodiments can be adjusted based on the requirements of the system. Further, regions that have previously appeared in the cache can indicate that a region is stable. Conversely, regions containing video content can result in lower cache hit rates because video frames typically do not repeat themselves. In some embodiments, if more than a threshold percentage of the region has been found in the cache for previous display frames, the region can be considered stable. The characteristics used by these embodiments are only exemplary. Any characteristics that can provide an indication that a region is stable can be used as a basis for determining stable regions.

Figure 7:
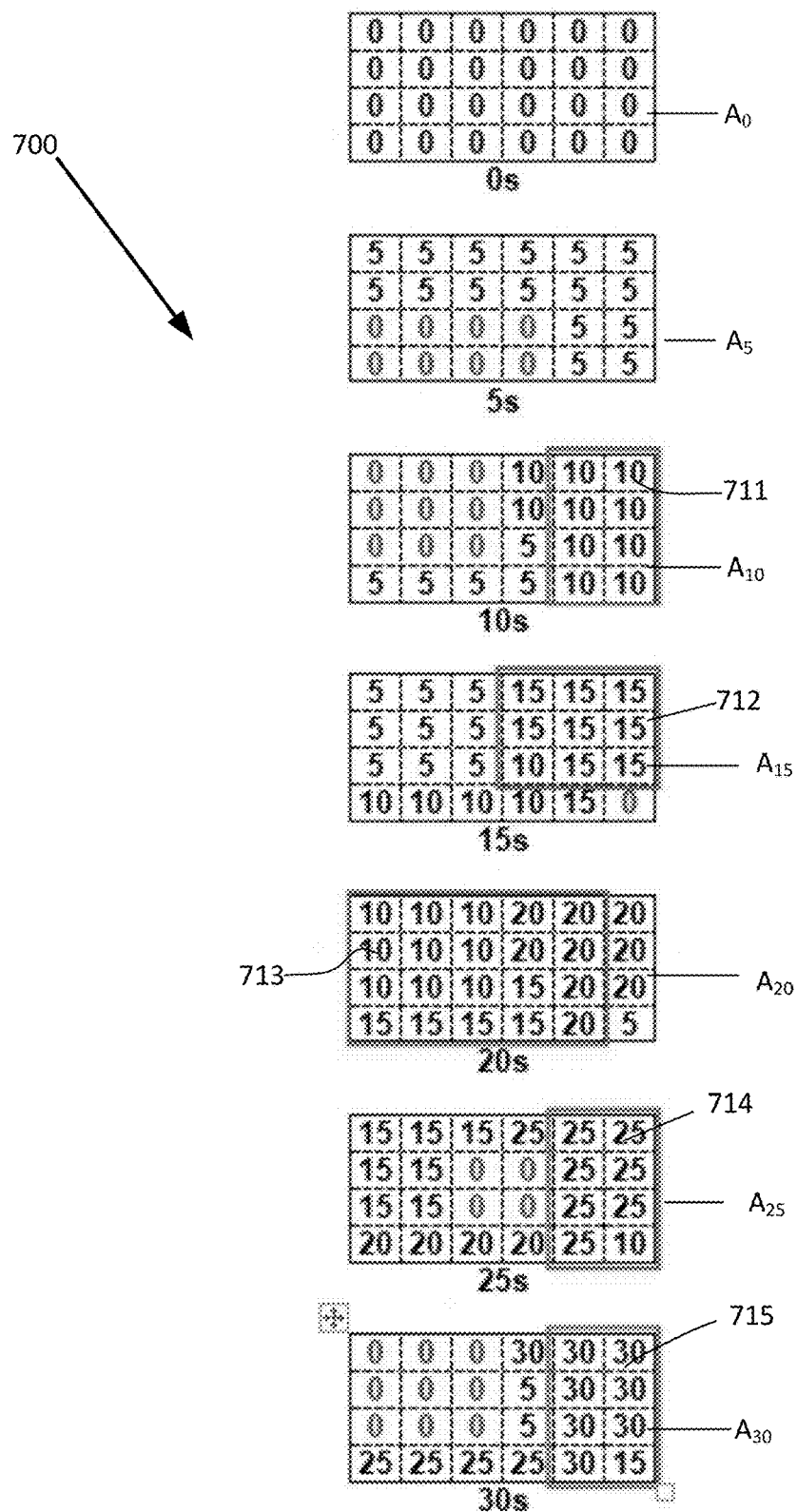
FIG. 7 illustrates example display frames corresponding to an image in a remote session display over a period of time in accordance with one or more illustrative aspects described herein.

In an example embodiment, stable region detector 441 may detect stable regions in a frame by comparing regions of each display frame with corresponding regions within prior frames associated with the image. FIG. 7 illustrates example display frames $A_0$, $A_5$, $A_{10}$, $A_{15}$, $A_{20}$, $A_{25}$, and $A_{30}$ corresponding to the image and sent from the host machine 400 to the remote client device 402 between an initial time "t" seconds and "t+30" seconds at 5 second intervals. In an embodiment, frames $A_1$ through $A_N$ (frames $A_0$, $A_5$, $A_{10}$, $A_{15}$, $A_{20}$, $A_{25}$, and $A_{30}$ of FIG. 7) can be associated with an application, such as a word processing application, an operating system, a web browsing application, or the like. For example, the frames $A_1$ through $A_N$ can be, or can include, at least a portion of a user interface (e.g., a desktop, a graphical user interface, an interactive interface) associated with the application. In some embodiments, the frames $A_1$ through $A_N$ can be associated with multiple applications (not shown) operating at the host machine.

As used in this disclosure, frames $A_1$ through $A_{N-1}$ are frames produced prior to the frame $A_N$ corresponding to the image. Accordingly, the frame $A_1$ through $A_{N-1}$ can be referred to as a previous or prior frames (with respect to the frame $A_N$), and the frame $A_N$ can be referred to as a subsequent frame (with respect to the frames $A_1$ through $A_N$) or as a current frame. In this embodiment, the frame $A_{N-1}$ is immediately prior to (e.g., adjacent in time to, consecutive to) the frame $A_N$ within the dynamic stream of images.

The stable regions in each frame (and thus the image) can be detected based on a comparison of portions of the current frame $A_N$ with prior frame $A_{N-1}$ (and/or any number of frames $A_1$ to $A_{N-1}$.) In certain embodiments, the comparisons of current frame $A_N$ with prior frame $A_{N-1}$ to determine which portions are volatile or stable can be performed on a block-by-block basis. For example, a block (or characteristics such as color, brightness, etc. thereof) in a current frame can be compared with blocks in prior frames to determine whether or not the block of the current frame should be designated as being volatile or stable. The block in the current frame can be at a location (also can be referred to as a block location) within the current frame that corresponds with block locations of the blocks in the prior frames. In some embodiments, a block can be defined by a set of pixels (e.g., bitmap pixels). For example, a block can be a 2×2 set of pixels, 2×4 set of pixels, 2×8 set of pixels, 4×4 set of pixels 8×8 set of pixels, an 8×16 set of pixels, a 16×16 set of pixels, or the like. In some embodiments, the block can have a different shape than a square or rectangle. For example, the block can be a 5-sided block. In some embodiments, the block can have a size that is a fraction (e.g., 0.3 times, 0.1 times, 0.01 times) of a size of an frame (e.g., frame A1). Although not shown in FIG. 7, in some embodiments, one or more blocks of the grid can have overlapping pixels rather than mutually exclusive blocks (or sets) of pixels.

Referring now to FIG. 7, each block in a frame 700 is assigned a value 0 at an initial time "t", where initial time "t" may have any integer value (frame $A_0$). At t+5 seconds, the blocks of frame $A_5$ are compared to that of frame $A_0$, and the values in each frame are updated based on the comparison. In an embodiment, the value in the blocks of the current frame $A_5$ that are identical to corresponding blocks (e.g., blocks in a corresponding block location) of the prior frame $A_0$ is incremented by 5 (i.e., the time period between the frames and indicative of the time the block has been stable). On the other hand, the value in the blocks of the current frame $A_5$ that are different from corresponding blocks of the prior frame $A_0$ remains 0. In an embodiment, once any pixel in a block changes with respect to the prior frame, the value in the current frame remains the same. At t+10 seconds, the blocks of frame $A_{10}$ are compared to that of frame $A_5$, and the values in each frame are updated based on the comparison. In an embodiment, the value in the blocks of the current frame $A_{10}$ that are identical to corresponding blocks of the prior frame $A_5$ is incremented by 5, and the value in the blocks of the current frame $A_5$ that are different from corresponding blocks of the prior frame $A_0$ remains the same (0 or 5).

In an embodiment, the above comparison may be performed every time a new frame for the image is received to identify the stable regions in the received frame. In an embodiment, the stable regions in a frame may be regions that include blocks that have not changed for at least a threshold period of time, such as, without limitation, 5 seconds, 10 seconds, 15, seconds, 20 seconds, 25 seconds, or the like. In a preferred embodiment, the threshold time is 10 seconds. In an embodiment, if the threshold time period is 10 seconds and shape of the stable regions is predefined as rectangular, frames $A_0$ and $A_5$ do not include any stable regions, frame $A_{10}$ includes example stable regions 701 and 702, frame $A_{15}$ includes example stable regions 711, 712, and 713, frame $A_{20}$ includes example a stable regions 721 and 722, frame $A_{25}$ includes example stable regions 731, 732, 733, and 734, frame $A_{30}$ includes example stable regions 741 and 742. A block may be reassigned a value "0"

if it changes after being stable for at least the above threshold period of time. For example, as shown in FIG. 7, the blocks that change after being stable for at least 10 seconds (i.e., the threshold period of time for detecting stable region) are assigned a 0 value. As such, for a frame $A_N$ received by the encoder, the stable regions in the frame may be identified by comparing it to a previously received frame $A_{N-1}$.

In some embodiments, differences between the blocks of current frame and the prior frame portion can be identified, for example, based on a pixel-by-pixel comparison associated with each of the blocks. In some embodiments, each of the pixels can be represented by bit values (e.g., red, green, blue (RGB) bit values) that can be compared with one another. For example, each of the pixels included in a block of the current frame $A_N$ can be compared with each of the pixels (at a corresponding bit location) included in the corresponding block of the prior frame $A_{N-1}$ to determine whether or not there are differences between the blocks. In some embodiments, hash values can be calculated for blocks of the current frame $A_N$ and compared with hash values of corresponding blocks (at corresponding or identical block locations) in the prior frame $A_{N-1}$ to determine whether or not there are differences. In other words, differences between the blocks of the current frame and the prior frame can be identified based on hash values calculated for each of the blocks of the respective frames. In some embodiments, one or more hash values can be calculated using methods now or hereafter known to those skilled in the art. In yet another embodiment, differences between the blocks of current frame and the prior frame portion can be identified based on match point scores and comparison as is known to those skilled in the art.

Referring back to FIG. 6, the stable region detector may update a cache 612 associated with the dynamic image and in communication with the encoder. In an embodiment, the stable region detector may save the identified stable regions of each frame of a dynamic image in the cache, if not already saved. The stable region detector may also update the cache to remove any previously saved stable regions that are no longer identified as stable. For example, every time one or more block values of a stable region changes to "0" (i.e., the region has changed), it may be removed from the cache and the cache may be refreshed. In an embodiment, the stable region detector may update or refresh the cache periodically, upon receipt of a new display frame, upon rendering of a new display frame, upon receipt of a display frame from a new application, or the like.

At 614, the encoder may, for the received display frame, identify and extract the largest stable region (in terms of size/pixel count) from the updated cache. For example, in FIG. 7, the largest stable region in frame $A_{10}$ is 702, the largest stable region in frame $A_{15}$ is 712, the largest stable region in frame $A_{20}$ is 721, the largest stable region in frame $A_{25}$ is 733 and/or 734, and the largest stable region in frame $A_{30}$ is 742. The encoder may identify and extract the largest stable region every time the cache is updated, upon receipt of a new display frame, periodically, or upon occurrence of other trigger events.

The encoder may then determine (616) whether the largest stable region of the frame has a total pixel count (i.e., height×width of the stable region) that is greater than or equal to a threshold value. In an embodiment, the threshold value is 2L, 3L, 4L, 5L, 6L, or the like. In a preferred embodiment, the threshold value is 4L. If the largest stable region has a total pixel count that is less than the threshold value, than the embedding module may perform a least significant bit (LSB) embedding algorithm on the whole frame to embed secret data into the frame (630), using now or hereafter known methods. In an embodiment, the encoder may perform the LSB algorithm on the whole frame to embed secret data in the frame for frame that do not include a stable region and/or for which stable region cannot be detected (for example, for initial frames that are displayed between time t=0 to t=threshold time period).

However, if the identified largest stable region has a total pixel count that is greater than or equal to the threshold value, the encoder may determine 618 whether the extracted largest stable region already has a secret data embedded in it. For example, secret data may already be embedded in the largest stable region during the processing of a previous frame that also included the same largest stable region, and thus the steps of embedding data in the stable region need not be performed again. In an embodiment, a stable region that has secret data embedded in it may include an identifier (e.g., a flag) indicating that secret data is already embedded in the region. If it is determined that the largest stable region already has a secret data embedded in it, then no new secret data is embedded in the largest identified stable area and the process continues to step 624. As such, by identifying stable areas in the frames, secret data need not be embedded in each new frame being transmitted to the remote computing device to conserve processing power and time.

However, if it is determined that the largest stable region does not have secret data embedded in it, and then the embedding module of the encoder may embed 620 secret data in the extracted largest stable region.

Figure 8:
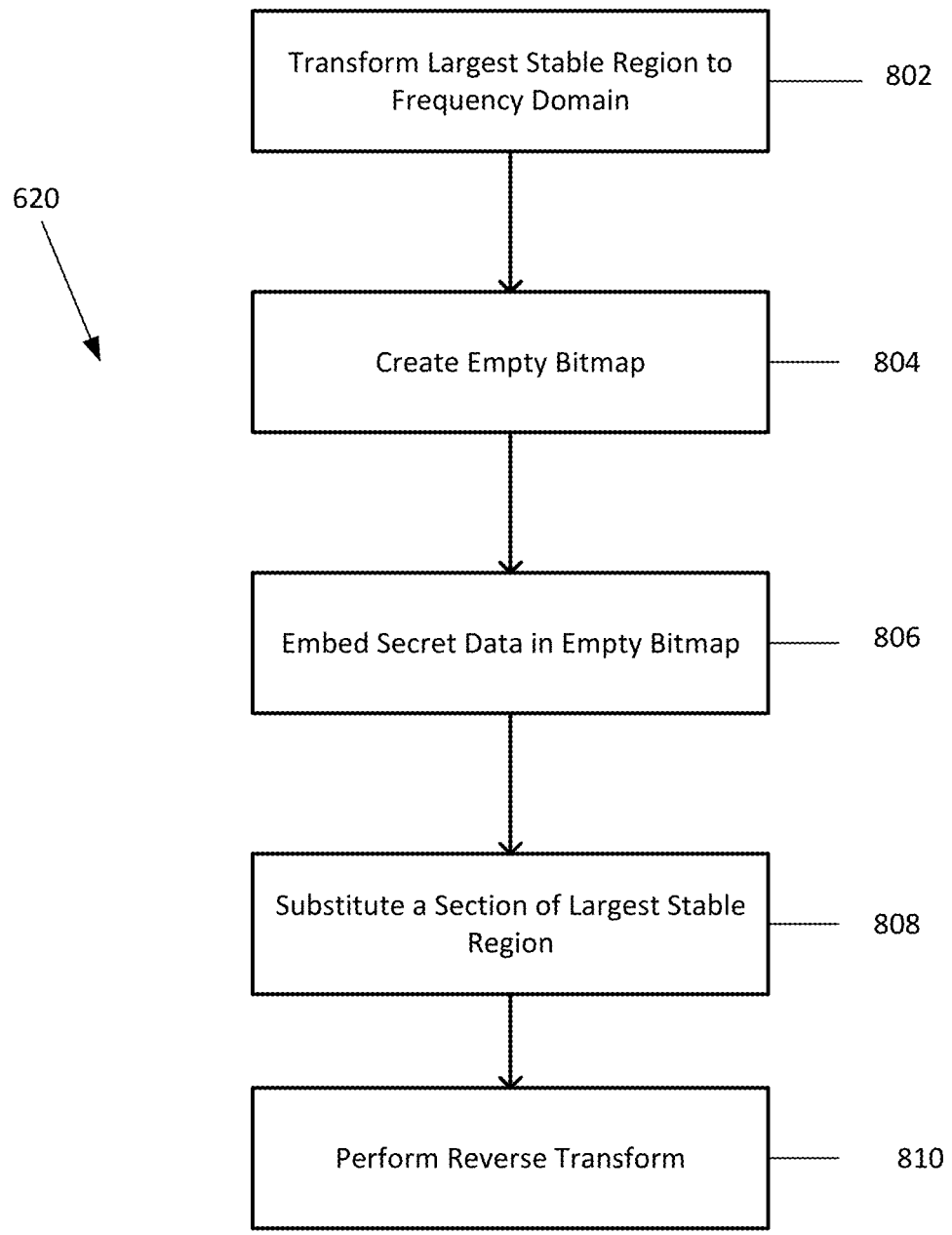
FIG. 8 is a flowchart illustrating an example method for embedding data in a largest stable region of a frame in accordance with one or more illustrative aspects described herein.
Figure 9:
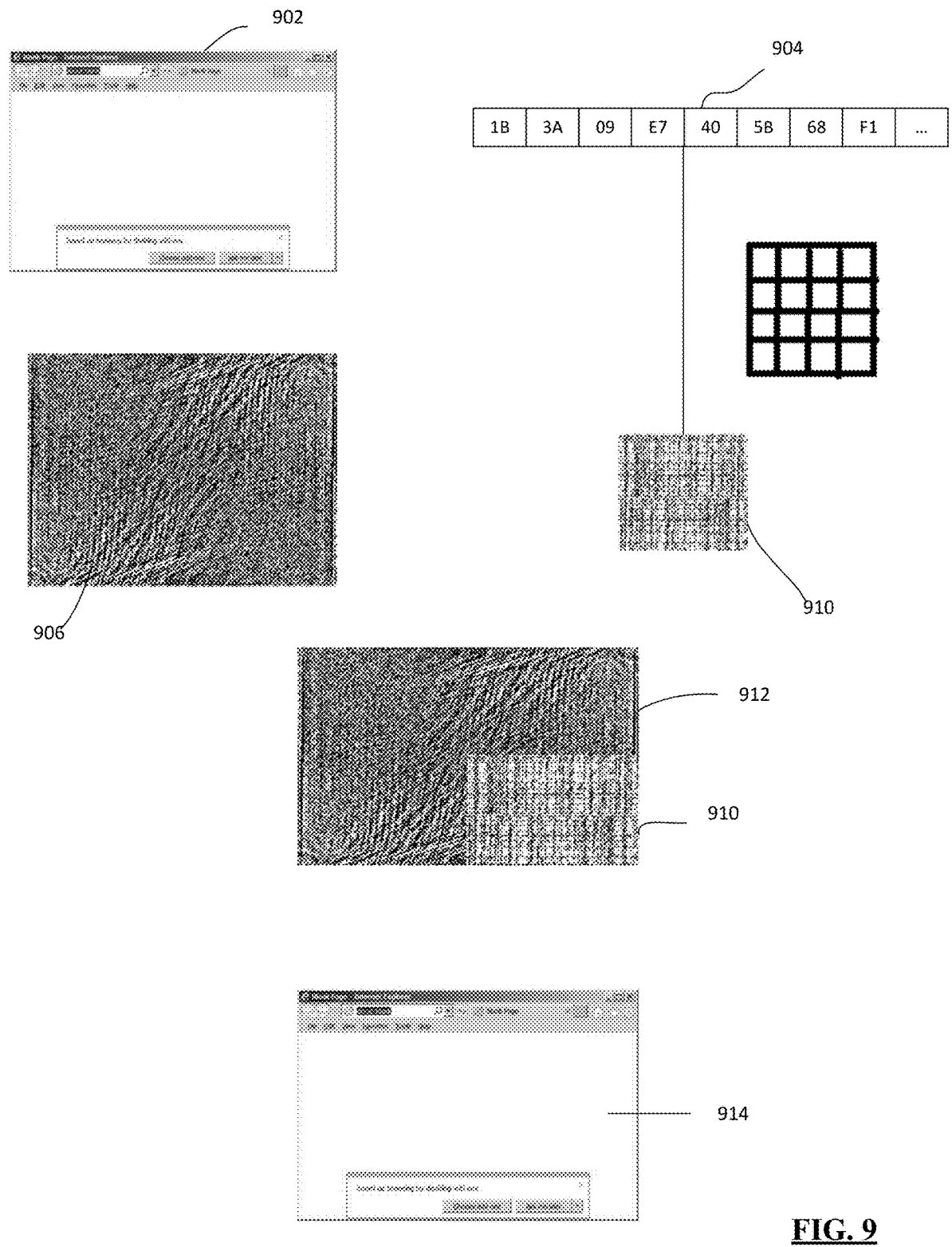
FIG. 9 is a schematic illustrating an example method for embedding data in a largest stable region of a frame in accordance with one or more illustrative aspects described herein.

FIG. 8 and FIG. 9 illustrate a method for embedding secret data in the largest stable region. In an embodiment, for embedding secret data in the largest stable region, the embedding module may first perform a transform function (802) on the largest stable region to transform the largest stable area from the space domain (902) to a frequency domain (906). For example, the embedding module may perform a 2-dimensional fast fourier transform (FFT) on the largest stable region (for e.g., bitmap format) to get a vector of its energy distribution on frequency domain. Other now or hereafter known methods of transforming the largest identified stable region are within the scope of this disclosure.

At 804, the embedding module may create a new empty bitmap (908) that has a size smaller than that of the largest stable region. For example, the empty bitmap 908 may have a size that is ½, ⅓, ¼, ⅕, etc. times the size of the largest stable region. In a preferred embodiment, 908 may have a size that is ¼ times the size of the largest stable region (for example, H/2×W/2 pixel size where H×W is the pixel size of the largest stable region). At 806, the embedding module may encode 908 by embedding the secret data 904 into 908 to create 910. In an embodiment, the embedding module may embed the secret data 904 into 908 to create redundancy with respect to the bits of the secret data. For example, the embedding module may divide 908 into a number of subsections and may fill each subsection with a value of a bit of the secret data 902 such that each bit of the secret data 902 is filled in at least one subsection. In an embodiment, the number of subsections is at least equal to the length of the secret data 902 (L).

At 808, the embedding module may substitute a section of 906 with the bitmap 910 created in step 806 to generate 912. In an embodiment, the embedding module may select a section of 906 for substitution so as to create least visual distortion or garbling of the display frame. For example, the selected section may be a corner section of 906. Preferably, the selected section may be the bottom right corner section of 906.

At 810, the embedding module may perform a reverse transform (e.g., reverse FFT) on 912 to generate a bitmap 914 of the largest stable region that includes the embedded secret data.

Referring back to FIG. 6, at 622, the encoder may add an identifier in the largest stable region including embedded data to indicate that the stable region has secret data embedded in it, and may replace the largest stable are in the cache with largest stable region including embedded data. At 624, the encoder may compose a composite display frame that includes the largest stable region with embedded secret data and other regions of the received display frame to create the whole dynamic image. The encoder may also encode the composite frame for transmission to a remote device. In an embodiment, the encoder may compose a composite frame by replacing the region of the received display frame that corresponds to the largest stable region with the largest stable region including the embedded secret data from step 620.

In an embodiment, upon unauthorized duplication of a screen image, the source of the duplicated screen image may be determined by first extracting LSB information from the duplicated screen image to determine if secret data is embedded in the LSB of the screen image. If the LSB information does not include the secret data, a mathematical transform (e.g., FFT) may first be performed on the whole duplicated screen image to obtain its frequency distribution. Secret data may then be obtained from, for example, the bottom right corner of the transformed image, and the stored key may be used to unencrypt the secret data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either software application or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A method for embedding data in a dynamic image of a remote session display, the method comprising, by a processor:
    receiving a display frame associated with the dynamic image;
    receiving data to be embedded in the display frame;
    identifying one or more stable regions in the display frame;
    upon identification of the one or more stable regions, updating a cache, wherein the cache comprises a plurality of stable regions corresponding to one or more display frames associated with the dynamic image;
    identifying, in the cache, a largest stable region corresponding to the display frame; and
    embedding the data to be embedded in the largest stable region to create a region including embedded data.

2. The method of claim 1, further comprising, by the processor, composing a composite frame by replacing an area corresponding to the largest stable region in the display frame with the region including embedded data.

3. The method of claim 1, further comprising, by the processor, encrypting the data to be embedded before performing the embedding.

4. The method of claim 1, further comprising, by the processor, before embedding the data to be embedded in the largest stable region:
    determining whether the largest stable region already includes the data to be embedded; and
    performing the embedding only if the largest stable region does not include the data to be embedded.

5. The method of claim 1, further comprising, by the processor, before embedding the data to be embedding in the largest stable region:
    determining whether a size of the largest stable region is less than a threshold size; and
    performing the embedding in the largest stable region only if the size of the largest stable region is not less than threshold size.

6. The method of claim 5, further comprising, in response to determining that the size of the largest stable region is less than the threshold size, embedding the data to be embedded in the display frame using a least significant bit algorithm.

7. The method of claim 5, wherein the threshold size is equal to at least four times a length of the data to be embedded.

8. The method of claim 5, wherein performing the embedding in the largest stable region comprises:
    performing a transform function on the largest stable region to create a frequency domain representation of the largest stable region;
    creating an empty bitmap;

embedding the data to be embedded in the empty bitmap to create a bitmap including embedded data;

substituting a section of the frequency domain representation of the largest stable region with the bitmap including embedded data to create a modified frequency domain representation; and performing a reverse transform function on the modified frequency domain representation.

9. The method of claim 8, wherein the transform function is a fast fourier transform (FFT) and the reverse transform function is a reverse FFT.

10. The method of claim 8, wherein substituting the section of the frequency domain representation of the largest stable region with the bitmap including embedded data comprises substituting a bottom right corner section of the frequency domain representation of the largest stable region.

11. The method of claim 8, wherein creating the empty bitmap comprises creating the empty bitmap that has a pixel height that is half of a pixel height of the largest stable area and a pixel length that is half of a pixel length of the largest stable area.

12. The method of claim 1, further comprising, by the processor:

including an identifier in the region including embedded data; and replacing the largest stable region with the region including embedded data in the cache.

13. The method of claim 1, wherein identifying the one or more stable regions in the display frame comprises comparing the display frame with at least one previous display frame associated with the dynamic image.

14. A system for embedding data in a dynamic image of a remote session display, the system comprising:

a processor; and a non-transitory computer-readable storage medium comprising programming instructions that are configured to cause the processor to:

receive a display frame associated with the dynamic image, receive data to be embedded in the display frame, identify one or more stable regions in the display frame, upon identification of the one or more stable regions, update a cache, wherein the cache comprises a plurality of stable regions corresponding to one or more display frames associated with the dynamic image, identify, in the cache, a largest stable region corresponding to the display frame, and embed the data to be embedded in the largest stable region to create a region including embedded data.

15. The system of claim 14, wherein the programming instruction further comprise instructions to cause the processor to compose a composite frame by replacing an area corresponding to the largest stable region in the display frame with the region including embedded data.

16. The system of claim 14, wherein the programming instruction further comprise instructions to cause the processor to encrypt the data to be embedded before performing the embedding.

17. The system of claim 14, wherein the programming instruction further comprise instructions to cause the processor to, before embedding the data to be embedded in the largest stable region:

determine whether the largest stable region already includes the data to be embedded; and perform the embedding only if the largest stable region does not include the data to be embedded.

18. The system of claim 14, wherein the programming instruction further comprise instructions to cause the processor to, before embedding the data to be embedding in the largest stable region:

determine whether a size of the largest stable region is less than a threshold size; and perform the embedding in the largest stable region only if the size of the largest stable region is not less than threshold size.

19. The system of claim 18, wherein the programming instruction further comprise instructions to cause the processor to, in response to determining that the size of the largest stable region is less than the threshold size, embed the data to be embedded in the display frame using a least significant bit algorithm.

20. The system of claim 18, wherein the threshold size is equal to at least four times a length of the data to be embedded.

21. The system of claim 18, wherein the programming instruction that cause the processor to perform the embedding in the largest stable region further comprise instruction to:

perform a transform function on the largest stable region to create a frequency domain representation of the largest stable region;

create an empty bitmap;

embed the data to be embedded in the empty bitmap to create a bitmap including embedded data;

substitute a section of the frequency domain representation of the largest stable region with the bitmap including embedded data to create a modified frequency domain representation; and perform a reverse transform function on the modified frequency domain representation.

22. The system of claim 21, wherein the transform function is a fast fourier transform (FFT) and the reverse transform function is a reverse FFT.

23. The system of claim 21, wherein the programming instruction that cause the processor to substitute the section of the frequency domain representation of the largest stable region with the bitmap including embedded data further comprise instructions to substitute a bottom right corner section of the frequency domain representation of the largest stable region.

24. The system of claim 21, wherein the programming instruction that cause the processor to create the empty bitmap comprise instructions to create the empty bitmap that has a pixel height that is half of a pixel height of the largest stable area and a pixel length that is half of a pixel length of the largest stable area.

25. The system of claim 14, wherein the programming instruction further comprise instructions to cause the processor to:

include an identifier in the region including embedded data; and replacing the largest stable region with the region including embedded data in the cache.

26. The system of claim 14, wherein the programming instruction that cause the processor to identify the one or more stable regions in the display frame comprise instructions to compare the display frame with at least one previous display frame associated with the dynamic image.

\* \* \* \* \*